(12) United States Patent
Kim et al.

(10) Patent No.: US 9,900,447 B2
(45) Date of Patent: Feb. 20, 2018

(54) METHOD OF TRANSMITTING CONTENT BETWEEN APPARATUSES AND CONTENT TRANSMISSION APPARATUS

(75) Inventors: Young-sun Kim, Suwon-si (KR); Hyun-cheol Park, Suwon-si (KR); Chang-seog Ko, Hwaseong-si (KR); Yoo-jin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1686 days.

(21) Appl. No.: 11/936,817

(22) Filed: Nov. 8, 2007

(65) Prior Publication Data

US 2008/0299901 A1 Dec. 4, 2008

(30) Foreign Application Priority Data

May 31, 2007 (KR) .................. 10-2007-0053485

(51) Int. Cl.
*H04B 7/24* (2006.01)
*H04N 1/00* (2006.01)
(Continued)

(52) U.S. Cl.
CPC ..... *H04N 1/00204* (2013.01); *H04N 1/00328* (2013.01); *H04N 1/32767* (2013.01);
(Continued)

(58) Field of Classification Search
USPC .......................................... 455/39
See application file for complete search history.

(56) References Cited

U.S. PATENT DOCUMENTS 8,144,920 B2 * 3/2012 Kansal et al. ............... 382/100
2002/0021903 A1 * 2/2002 Ito et al. ...................... 396/429
(Continued)

FOREIGN PATENT DOCUMENTS

JP 2004015284 A * 1/2004
JP 2005252457 A * 9/2005

OTHER PUBLICATIONS

Communication dated Nov. 20, 2013 from the Korean Intellectual Property Office in a counterpart application No. 10-2007-0053485.
(Continued)

*Primary Examiner* — Gennadiy Tsvey
(74) *Attorney, Agent, or Firm* — Sughrue Mion, PLLC (57) ABSTRACT

A method of obtaining identification information, and based on the obtained identification, wirelessly transmitting content between apparatuses, and a content transmission apparatus are provided. The method obtains the identification information on a content reception apparatus or a content backup apparatus by using an affordance function of a content transmission apparatus or a content providing apparatus. The method and the content transmission apparatus include obtaining identification information on a second apparatus by using a first apparatus; outputting confirmation information on the second apparatus from the first apparatus, based on the obtained identification information on the second apparatus; and wirelessly transmitting the content from the first apparatus to the second apparatus, so as to enable the content to be conveniently transmitted between the apparatuses and to provide easy accessibility to a content reception apparatus.

18 Claims, 5 Drawing Sheets

(51) Int. Cl.
*H04N 1/327* (2006.01)
*H04N 101/00* (2006.01)

(52) U.S. Cl.
CPC . *H04N 2101/00* (2013.01); *H04N 2201/0041* (2013.01); *H04N 2201/0055* (2013.01); *H04N 2201/0084* (2013.01)

(56) References Cited

U.S. PATENT DOCUMENTS

| | | |
|---|---|---|
| 2004/0029526 A1* | 2/2004 | Miki et al. ............. 455/11.1 |
| 2004/0140971 A1* | 7/2004 | Yamazaki et al. ........ 345/204 |
| 2004/0152440 A1* | 8/2004 | Yoda et al. ............. 455/403 |
| 2005/0003799 A1* | 1/2005 | Kang ............... H04M 1/673 |
| | | 455/411 |
| 2007/0013775 A1* | 1/2007 | Shin ................... 348/114 |
| 2008/0237352 A1* | 10/2008 | Uchida .......... G06K 7/10881 |
| | | 235/472.02 |

OTHER PUBLICATIONS

Communication dated Aug. 21, 2013 issued by the Korean Intellectual Property Office in counterpart Korean Patent Application No. 10-2007-0053485.

\* cited by examiner

METHOD OF TRANSMITTING CONTENT BETWEEN APPARATUSES AND CONTENT TRANSMISSION APPARATUS

CROSS-REFERENCE TO RELATED PATENT APPLICATION

This application claims the benefit of Korean Patent Application No. 10-2007-0053485, filed on May 31, 2007, in the Korean Intellectual Property Office, the disclosure of which is incorporated herein in its entirety by reference.

BACKGROUND OF THE INVENTION

1. Field of the Invention

The present invention relates to content transmission between apparatuses, and more particularly, to a method of wirelessly transmitting content between apparatuses and a content transmission apparatus.

2. Description of the Related Art

In a conventional method, in order to transmit content between apparatuses, a connection cable has to be connected between the apparatuses. For example, when content is transmitted to an apparatus such as a Personal Computer (PC) or a television (TV) by using an apparatus in which an image capturing unit is installed, a connection cable is connected between the apparatus in which the image capturing unit is installed and the apparatus such as the PC or the TV, and then the content is transmitted. Examples of the apparatus in which the image capturing unit is installed are a digital camera, a portable communication terminal, or the like. The PC or the TV may be a content reception apparatus or a content backup apparatus. In the case where the apparatus, in which the image capturing unit is installed, is used, the content may include a captured still image, a captured moving-picture, music, or text. The content transmission may be used as content backup.

Hence, in order to transmit content between apparatuses, users have to manage a connection cable capable of being used between the apparatuses, and when the user initially uses a device, the user has to understand and study a connection unit to which the connection cable is connected.

In order to solve the above described problems, a technology capable of wirelessly transmitting content between apparatuses is provided.

SUMMARY OF THE INVENTION

The present invention provides a method of wirelessly transmitting content between apparatuses, based on identification information on a content reception apparatus or a content backup apparatus, and a content transmission apparatus therefor.

The present invention also provides a method of obtaining the identification information on a content reception apparatus or a content backup apparatus by using an affordance function of a content transmission apparatus (or a content providing apparatus), and based on the obtained identification, wirelessly transmitting content between apparatuses, and a content transmission apparatus therefor.

According to an aspect of the present invention, there is provided a method of transmitting content between apparatuses, the method including the operations of obtaining identification information on a second apparatus by using a first apparatus; outputting confirmation information on the second apparatus from the first apparatus, based on the obtained identification information on the second apparatus; and wirelessly transmitting the content from the first apparatus to the second apparatus.

The operation of obtaining the identification information may be performed by using an affordance function of the first apparatus. In particular, when the first apparatus is an apparatus in which an image capturing unit is installed, the obtaining of the identification information is performed by using an image capture function of the first apparatus.

The identification information on the second apparatus may be one of an image, a bar code, and a bar code image of the second apparatus. The image of the second apparatus may be an image of the second apparatus including a connection unit to which a connection cable for transmitting the content is connected.

The operation of outputting the confirmation information may output the confirmation information on the second apparatus, based on a result of comparing information on content reception apparatuses pre-stored in the first apparatus and the obtained identification information.

The confirmation information on the second apparatus may further include information confirming whether to transmit the content.

According to another aspect of the present invention, there is provided a content transmission apparatus including an identification information obtaining unit obtaining identification information on a content reception apparatus; a storage unit storing identification information on at least one apparatus, and at least one item of content; a control unit checking whether identification information corresponding to identification information obtained from the identification information obtaining unit is stored in the storage unit, outputting a result of the checking, and controlling transmission of content stored in the storage unit to the content reception apparatus;

an output unit being controlled by the control unit to output the result of the checking; and a transmission unit being controlled by the control unit to wirelessly transmit the content to the content reception apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

The present invention provides a method of transmitting content and an apparatus therefor. By using a specialized affordance function of a content transmission or providing apparatus (hereinafter, a content transmission apparatus), the method obtains identification information on a content reception or backup apparatus (hereinafter, a content reception apparatus), such as an image, a bar code, a bar code image of the content reception apparatus, and by using the obtained identification information, the method outputs confirmation information on the content reception apparatus so that the user can be notified. Based on the output confirmation information, when the user requests transmission of content, the method wirelessly transmits the content from the content transmission apparatus to the content reception apparatus.

Accordingly, the present invention may provide a digital camera which captures an image of an object, then sequentially captures an image of the content reception apparatus to which the image of the object is to be transmitted, and transmits the captured image of the object to the content reception apparatus by using the captured image of the content reception apparatus as identification information on the content reception apparatus. Here, the specialized affordance function corresponds to an image capture function of the digital camera.

Figure 1:
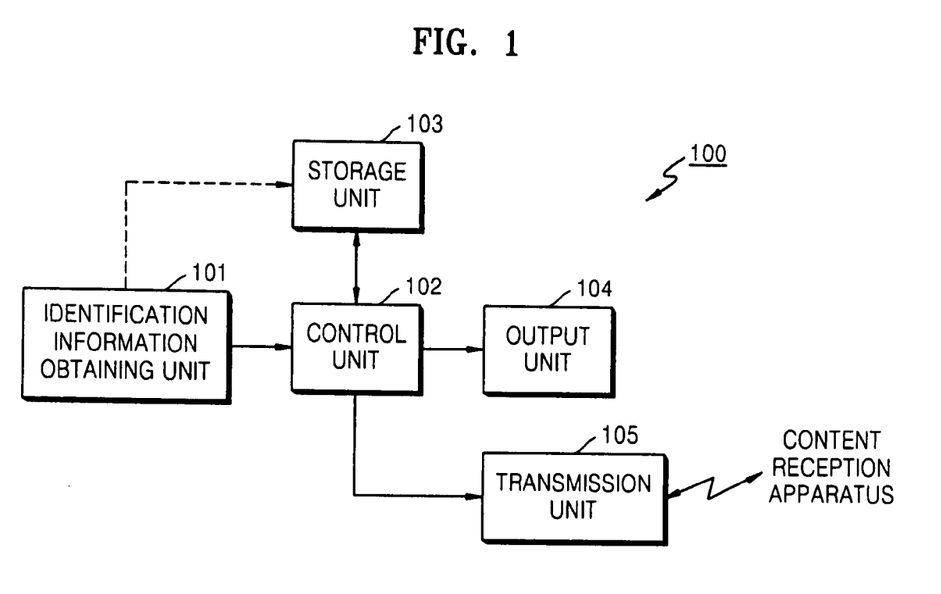
FIG. 1 is a block diagram of a content transmission apparatus according to an embodiment of the present invention.

FIG. 1 is a block diagram of a content transmission apparatus 100 according to an embodiment of the present invention.

Referring to FIG. 1, the content transmission apparatus 100 includes an identification information obtaining unit 101, a control unit 102, a storage unit 103, an output unit 104, and a transmission unit 105.

The identification information obtaining unit 101 obtains identification information on a content reception apparatus (not shown). The identification information obtaining unit 101 obtains the identification information by using an affordance function of the content transmission apparatus 100. In the case where the content transmission apparatus 100 is a digital camera, or a portable terminal having a digital camera function, the affordance function may be an image capture function based on an image capturing action. In the case where the affordance function corresponds to the image capture function, the identification information obtaining unit 101 may be an image capturing unit.

In the case where the identification information obtaining unit 101 is the image capturing unit, the identification information may be one of an image and a bar code image of the content reception apparatus. The image of the content reception apparatus may be an image of the content reception apparatus including a connection unit installed in the content reception apparatus. The connection unit is a part to which a connection cable for transmitting content is connected. The bar code image is an image including a unique bar code adhered to the content reception apparatus.

In the case where the identification information obtaining unit 101 is the image capturing unit and the content transmission apparatus 100 is a digital camera, the identification information obtaining unit 101 may sequentially capture an image of identification information on the content reception apparatus (not shown) following capturing of an image of at least one object, and may obtain the identification information by using the affordance function. That is, in the case where captured images include an image corresponding to content to be transmitted and an image corresponding to identification information on the content reception apparatus (not shown), the identification information obtaining unit 101 may obtain a lastly captured still image as an image corresponding to the identification information on the content reception apparatus (not shown). The obtained identification information is transmitted to the control unit 102, and the captured images of an object, except for the identification information, are stored in the storage unit 103 as the content.

The identification information obtaining unit 101 may be implemented by a method of obtaining the identification information from bar code information input by users. In the case where the bar code information is obtained as the identification information, the identification information obtaining unit 101 may be an input information reception unit receiving information input by users.

Thus, the identification information may be at least one from among information such as an image of a content reception apparatus, a bar code image, a bar code, or the like. When transmitting content, the identification information obtaining unit 101 may perform an operation for obtaining the identification information.

When the identification information on the content reception apparatus obtained from the identification information obtaining unit 101 is received, the control unit 102 checks information stored in the storage unit 103 so as to check whether corresponding information is stored, and outputs the checked result to the output unit 104. In the case where the identification information obtained from the identification information obtaining unit 101 is an image, the control unit 102 may check whether corresponding information is stored in the storage unit 103, considering an acceptable tolerance between identification information stored in the storage unit 103 and the identification information obtained from the identification information obtaining unit 101. That is, when identification information similar to the obtained identification information is stored in the storage unit 103, the control unit 102 determines that information corresponding to the obtained identification information is stored in the storage unit 103.

The storage unit 103 stores at least one item of content and the at least one piece of identification information on the content reception apparatus. The at least one piece of identification information on the content reception apparatus is pre-stored in the storage unit 103. The identification information stored in the storage unit 103 may be at least one from among information such as an image, a bar code, a bar code image, or the like. In the case where the identification information obtaining unit 101 is an image capturing unit, the at least one content to be stored in the storage unit 103 may be content based on a captured image transmitted from the identification information obtaining unit 101. In the case where content stored in the storage unit 103 is the content based on the captured image, the content may be content based on an image sequentially captured following an image corresponding to identification information on the content reception apparatus (not shown), or content based on an image not sequentially captured following the image corresponding to the identification information on the content reception apparatus (not shown).

When identification information corresponding to the obtained identification information exists in the storage unit 103, the control unit 103 outputs information indicating a content reception apparatus based on the obtained identification information, to the output unit 104. The information indicating the content reception apparatus may be a name of the content reception apparatus, an owner and name of the content reception apparatus, or the like. The information output to the output unit 104 may further include information confirming whether to transmit content. The output unit 104 may be a display unit displaying the output information.

When transmission of content is requested based on the information which confirms whether to transmit the content and which is output from the output unit 104, the control unit 103 reads content stored in the storage unit 103 and wirelessly transmits the read content to the content reception apparatus (not shown) via the transmission unit 105. Accordingly, the content reception apparatus (not shown) wirelessly receives the content.

In order to transmit content in an environment in which a plurality of content reception apparatuses operate, the content transmission apparatus 100 illustrated in FIG. 1 may obtain identification information on a content reception apparatus to which the content is to be transmitted or in which the content is to be stored as backup from among the plurality of content reception apparatuses, by using the identification information obtaining unit 101, so as to determine the content reception apparatus.

Figure 2:
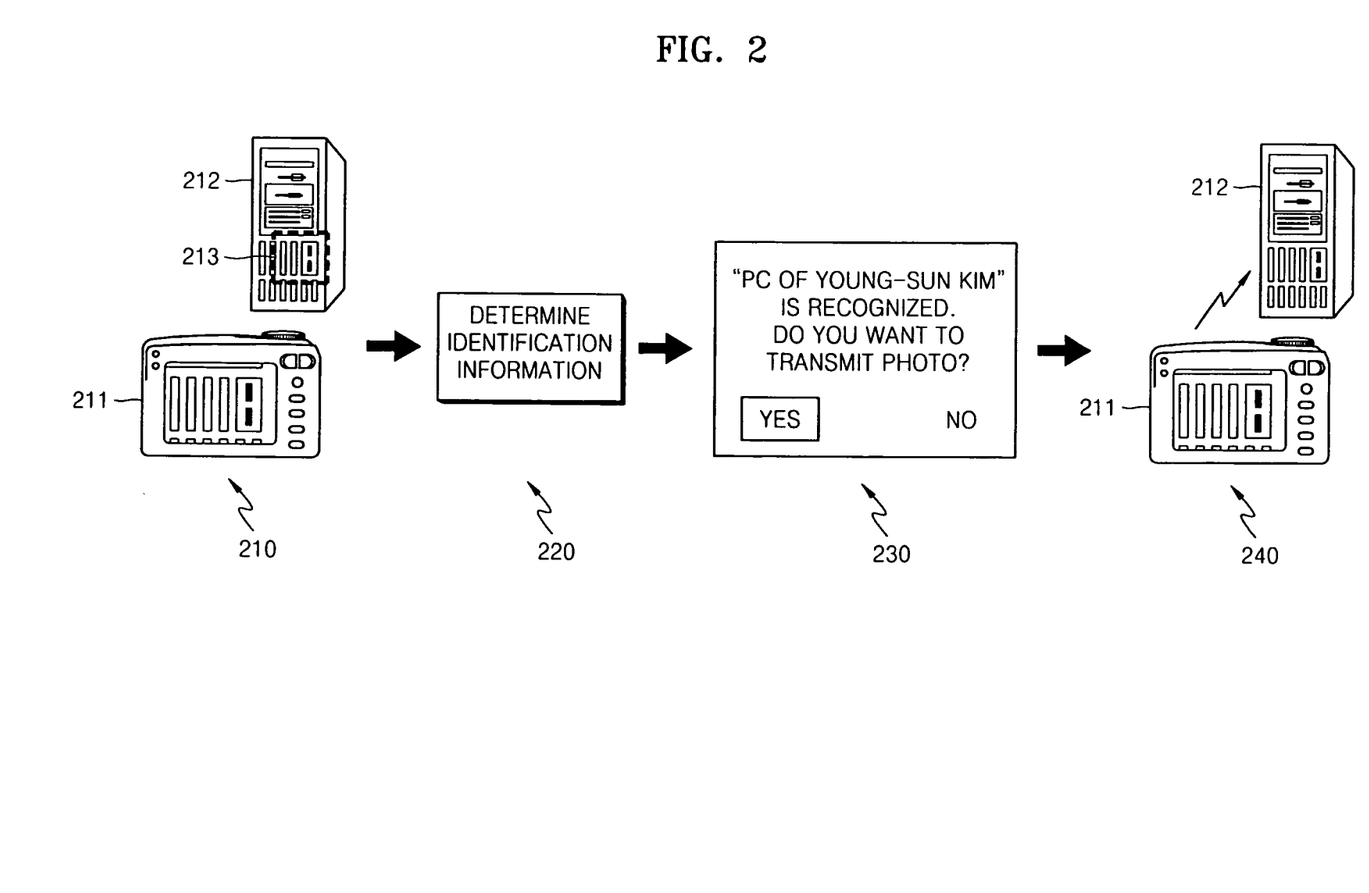
FIG. 2 is a diagram illustrating a transmission process between apparatuses in the case where the content transmission apparatus illustrated in FIG. 1 is a digital camera.

FIG. 2 is a diagram illustrating a content transmission process between apparatuses in the case where a content transmission apparatus 100 illustrated in FIG. 1 is a digital camera.

First, in operation 210 illustrated in FIG. 2, a digital camera 211 that is a content transmission apparatus, captures an image of an area 213 including a connection unit of a Personal Computer (PC) 212, so as to transmit content to the PC 212 that is a content reception apparatus. Thus, an image of the area 213 is obtained as identification information on the PC 212. At this time, the digital camera may sequentially perform an operation of capturing an image of at least one object and an operation of capturing an image of the area 213 including the connection unit of the PC 212.

Next, in operation 220, the obtained identification information is determined. At this time, the determination is for comparing identification information on a content reception apparatus, pre-stored in the digital camera 211, with the obtained identification information, and to check whether the same or similar identification information exists. For example, the checking operation may be performed by using an image matching method. As a result, when the same or similar identification information exists, as illustrated in operation 230, the digital camera 211 displays information indicating the PC 212 and information for confirming whether to transmit content. In operation 230, the information indicating the PC 212 is "PC of Young-sun, KIM is recognized", and the information for confirming whether to transmit the content is "Do you want to transmit a photo? Yes/No".

Based on the displayed information as illustrated in operation 230, when a user selects "Yes", this means the user requires the content to be transmitted to the PC 212. Therefore, in operation 240, the digital camera 211 wirelessly transmits the content to the PC 212. At this time, the transmitted content may be all the content stored in the digital camera 211 or a part of the content. This may be selected by the user.

Figure 3:
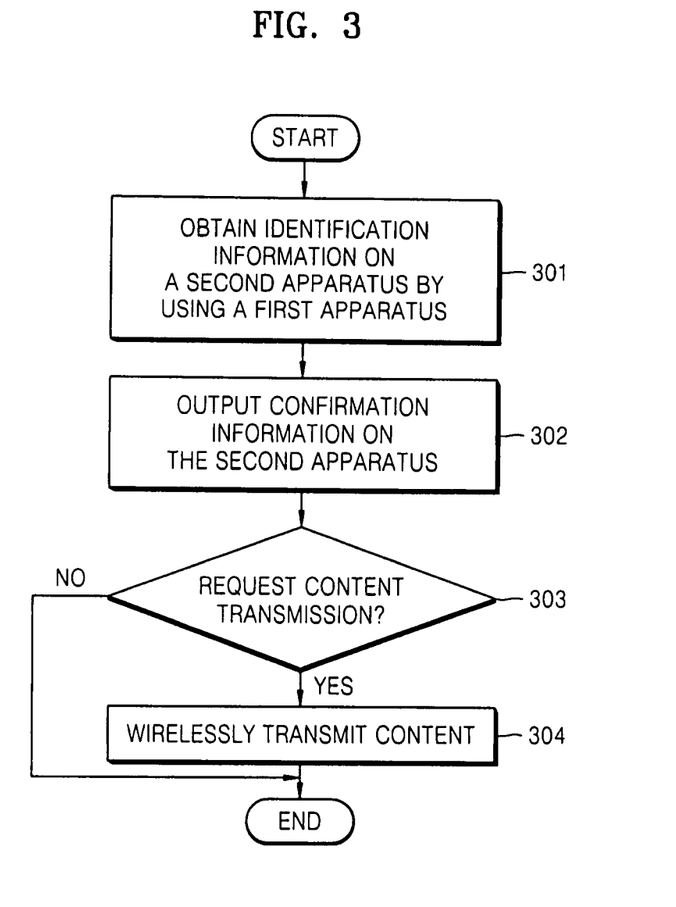
FIG. 3 is a flowchart illustrating a transmission process between apparatuses according to an embodiment of the present invention.

FIG. 3 is a flowchart illustrating a transmission process between apparatuses according to an embodiment of the present invention. In FIG. 3, a first apparatus is a content transmission apparatus 100 illustrated in FIG. 1, and a second apparatus is a content reception unit. That is, when the first apparatus and the second apparatus are applied to the case illustrated in FIG. 2, the first apparatus may be a digital camera 211 and the second apparatus may be a PC 212.

In operation 301, identification information on a second apparatus is obtained by using a first apparatus. The identification of the second apparatus may be obtained by a method similar to that of the identification information obtaining unit 101 described in relation to FIG. 1. In other words, the identification information on the second apparatus may be obtained by using an affordance function of the first apparatus. When the first apparatus is an apparatus in which an image capturing unit is installed, the identification information on the second apparatus may be obtained by using an image capture function of the first apparatus. The identification information on the second apparatus may be one of an image, a bar code, and a bar code image of the second apparatus. The image of the second apparatus may be an image of the second apparatus including a connection unit to which a connection cable for transmitting content is connected.

At this time, as described in relation to FIG. 1, the identification information on the second apparatus may be obtained based on an image sequentially captured following an operation for capturing an image of at least one object. That is, an image of at least one object is captured, and if a content reception apparatus is included in the at least one object, then, identification information corresponding to the content reception apparatus may be obtained from the captured image. A method of obtaining identification information corresponding to a content reception apparatus from a captured image may obtain an image of an object that is lastly captured, as the identification information corresponding to the content reception apparatus, as described in relation to FIG. 1.

In operation 302, confirmation information on the second apparatus is output. That is, based on a result of comparing the identification information on the second apparatus obtained from an operation 301 and information on content reception apparatuses pre-stored in the first apparatus, the confirmation information on the second apparatus is output. As a result of the comparison, when information the same or similar to the obtained identification information on the second apparatus is included in the information on the content reception apparatuses pre-stored in the first apparatus, information indicating the second apparatus is output as the confirmation information of the second apparatus. The output information indicating the second apparatus is the same as that of operation 230 illustrated in FIG. 2. The confirmation information on the second apparatus further includes information confirming whether to transmit content.

As a result of the comparison, when information the same or similar to the obtained identification information on the second apparatus is not included in the information on the content reception apparatuses pre-stored in the first apparatus, the confirmation information on the second apparatus informing that the second apparatus cannot be selected as a content reception apparatus may be output.

In operation 303, based on the information confirming whether to transmit the content, when content is determined to be requested for transmission, in operation 304, the content is wirelessly transmitted from the first apparatus to the second apparatus. At this time, the transmitted content may be an image corresponding to at least one object from among objects whose images have been captured. However, in operation 303, when content is determined not to be requested for transmission, content transmission is not performed.

Figure 4:
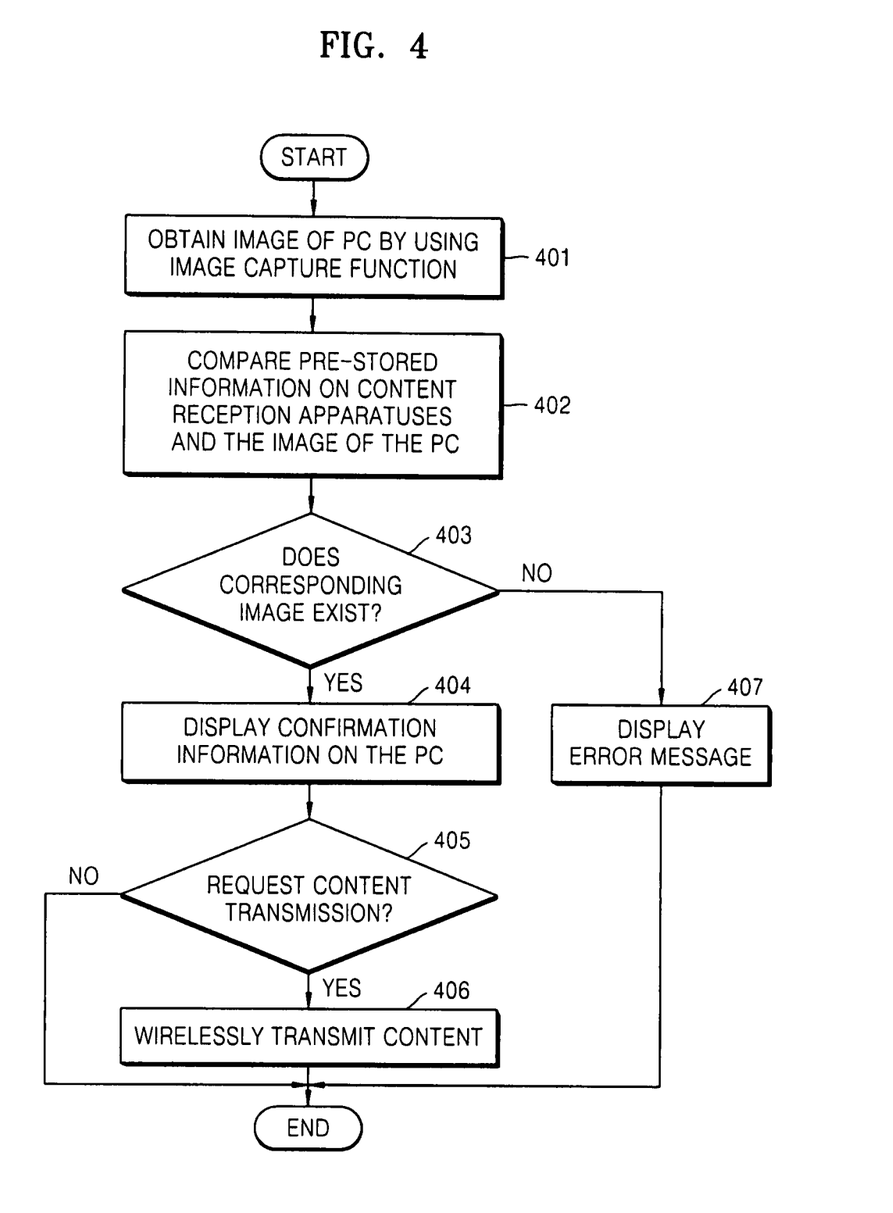
FIG. 4 is a flowchart illustrating a transmission process between a digital camera and a personal computer (PC) based on the flowchart illustrated in FIG. 3.

FIG. 4 is a flowchart illustrating a content transmission process between a digital camera and a PC based on the flowchart illustrated in FIG. 3. The flowchart illustrated in FIG. 4 is described below, referring to FIG. 2.

In operation 401, an image 213 of a PC 212 is obtained by using an image capture function of a digital camera 211. In operation 402, the digital camera 211 compares pre-stored information on content reception apparatuses with the image 213 of the PC 212.

As a result, in operation 403, when it is determined that a corresponding image exists, in operation 404, confirmation information on the PC 212 is displayed on the digital camera 211. The confirmation information is similar to that of operation 302 described in relation to FIG. 3. In operation 405, based on the displayed confirmation information, when it is determined that a user requests content transmission, in operation 406, content is wirelessly transmitted from the digital camera 211 to the PC 212. A content transmission request by the user in operation 405 may be defined as a transmission request input from the outside.

Meanwhile, when it is determined that the corresponding image does not exist in operation 403, the digital camera 211 displays an error message in operation 407. At this time, the error message may be a message informing that the PC 212 is not available for use as a content reception apparatus or a similar type of the message.

Figure 5:
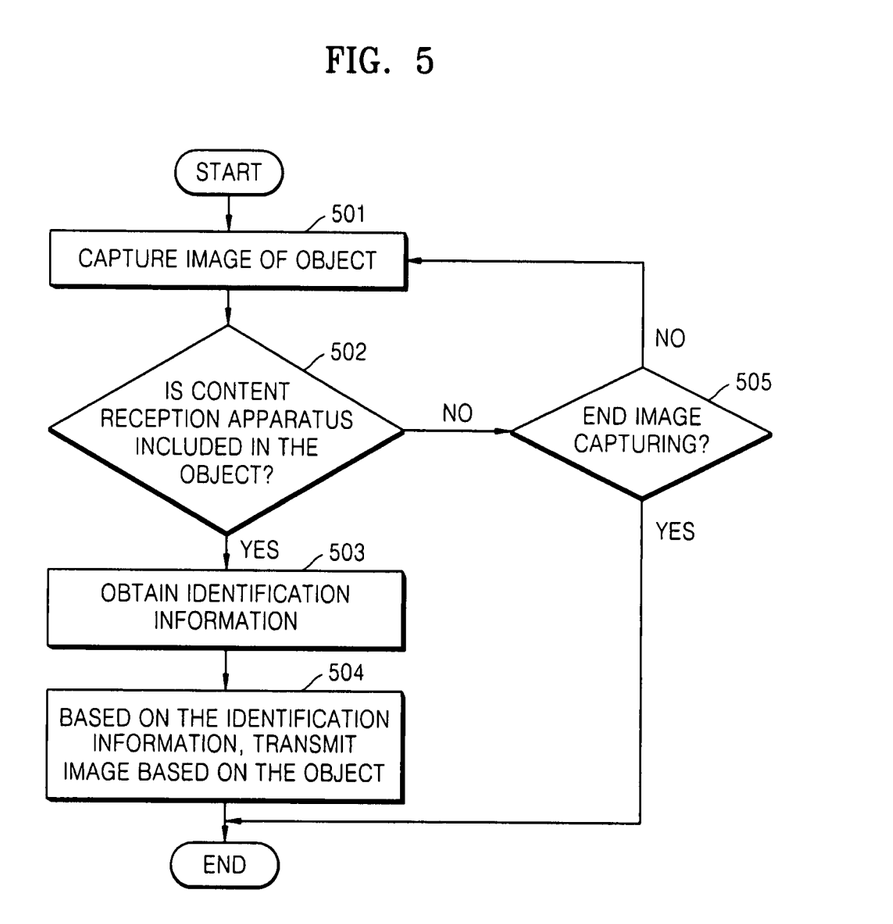
FIG. 5 is a flowchart illustrating a method of transmitting content according to another embodiment of the present invention.

FIG. 5 is a flowchart illustrating a method of transmitting content according to another embodiment of the present invention. The method of transmitting the content illustrated in FIG. 5 is the case where a content reception apparatus is included in objects whose images are captured by using a digital camera.

In operation 501, a digital camera captures an image of at least one object. At this time, the object may be a content reception apparatus or desired content for photographing. In operation 502, the digital camera checks whether a content reception apparatus is included in the captured object. This checking operation may be performed by using a method which monitors information input by a user. For example, when the user captures an image of an apparatus corresponding to a content reception apparatus and inputs information indicating that an image of the content reception apparatus has been captured, the digital camera may determine that the image of the content reception apparatus is included in objects whose images are captured. Otherwise, the checking operation described in operation 502 may be performed by a method of pre-storing images of content reception apparatuses and then comparing the pre-stored images with a captured image of an object.

In operation 503, when an image of a content reception apparatus is included in images of the objects, the digital camera obtains identification information on the content reception apparatus from an image based on the objects whose images have been captured. The obtaining of identification information on a content reception apparatus is similar to that described in relation to FIGS. 3 and 4. In operation 504, based on the obtained identification information, the digital camera wirelessly transmits the image based on the objects whose images have been captured to the content reception apparatus. The transmission of the image based on the obtained identification information is similar to the wireless transmission described in relation to FIGS. 3 and 4. The transmission of the image based on the objects whose images have been captured may be performed by a transmission request input from the outside of the digital camera. The transmission request input from the outside is information input by users.

Meanwhile, in operation 502, when an image of a content reception apparatus is determined not to be included in the objects whose images have been captured, in operation 505, the digital camera checks whether image capturing has ended. When it is determined that the image capturing has ended, the digital camera ends operations. Accordingly, the digital camera has performed only a general function for capturing images of objects. However, when it is determined that the image capturing has not ended, the digital camera returns to operation 501 and repeats the above described operations.

As described above, based on identification information such as an image, a bar code, or the like, the present invention can wirelessly transmit content between apparatuses, so as to enable the content to be conveniently transmitted between the apparatuses and to provide easy accessibility to a content reception apparatus.

Also, the present invention can obtain identification information on a content reception apparatus by using an affordance function such as a image capture function of a content transmission apparatus, and based on the obtained identification information, can wirelessly transmit content between apparatuses, so as to provide a wireless communication environment based on an affordance function of an apparatus.

For example, when an image of at least one object is captured by an apparatus in which an image capturing unit is installed, and an image of a content reception apparatus is included in the captured object, the present invention can obtain identification information on a content reception apparatus or an image of a content reception apparatus based on the object whose image is captured, and based on the obtained identification information, can wirelessly transmit content between apparatuses, so as to provide a wireless communication environment based on an image capture function (an affordance function) of the apparatus in which a photographing unit is installed.

The invention can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:
1. A method of transmitting at least one content between apparatuses, the method comprising:
  obtaining the at least one content to be transmitted from a first apparatus to a second apparatus;

obtaining identification information of the second apparatus by photographing an image of the second apparatus using the first apparatus;

comparing the obtained identification information of the second apparatus with identification information of at least one content reception apparatus pre-stored in the first apparatus;

outputting confirmation information of the identification of the second apparatus on the first apparatus if a difference between the identification information of at least one content reception apparatus pre-stored in the first apparatus and the obtained identification information of the second apparatus is within a predetermined tolerance;

displaying a message inquiring whether to transmit the at least one content to the second apparatus on the first apparatus;

outputting a request for transmitting the at least one content from the first apparatus to the second apparatus, when the obtained identification information of the second apparatus is included in the identification information of the at least one content reception apparatus pre-stored in the first apparatus, and in response to a user confirming the identification of the second apparatus; and wirelessly transmitting the at least one content from the first apparatus to the second apparatus in response to the request.

2. The method of claim 1, wherein the obtaining of the identification information is performed by using an affordance function of the first apparatus.

3. The method of claim 1, wherein when the first apparatus is an apparatus in which an image capturing unit is installed, the obtaining of the identification information is performed by using an image capture function of the first apparatus.

4. The method of claim 1, wherein the identification information on the second apparatus is one of an image of the second apparatus, a bar code of the second apparatus, and a bar code image of the second apparatus.

5. The method of claim 4, wherein the image of the second apparatus is an image of the second apparatus comprising a connection unit image of the second apparatus.

6. The method of claim 1, wherein the outputting of the confirmation information is based on a result of the comparing and the obtained identification information of the second apparatus.

7. The method of claim 6, wherein the confirmation information indicating the second apparatus further comprises information confirming whether to transmit the content, and when content transmission is requested based on the confirmation information, the transmitting of the content is performed.

8. The method of claim 1, wherein the obtaining of the identification information is performed by capturing an image of an identification information disposed on the second apparatus by using the first apparatus.

9. A content transmission apparatus comprising:

an identification information obtaining unit obtaining identification information of a content reception apparatus by photographing an image of the content reception apparatus;

a storage unit storing identification information of at least one apparatus, and at least one of content;

a control unit comparing the obtained identification information of the content reception apparatus with the identification information of the at least one apparatus stored in the storage unit, outputting confirmation information of the content reception apparatus, displaying a message inquiring whether to transmit the at least one content to the content reception apparatus, outputting a request for transmitting the at least one content from the content transmission apparatus to the content reception apparatus, when a difference between the obtained identification information of the content reception apparatus and the identification information of the at least one apparatus stored in the storage unit is within a predetermined tolerance and in response to a user confirming the content reception apparatus and controlling transmission of the at least one content stored in the storage unit to the content reception apparatus; and a transmission unit which is controlled by the control unit to wirelessly transmit the at least one content stored in the storage unit to the content reception apparatus in response to the request.

10. The content transmission apparatus of claim 9, wherein the identification information obtaining unit obtains the identification information by using an affordance function of the content transmission apparatus.

11. The content transmission apparatus of claim 9, wherein when the content transmission apparatus is an apparatus in which an image capturing unit is installed, the identification information obtaining unit is the image capturing unit.

12. The content transmission apparatus of claim 9, wherein the identification information is one of an image of the content reception apparatus, a bar code of the content reception apparatus, and a bar code image of the content reception apparatus.

13. The content transmission apparatus of claim 12, wherein the image is an image of the content reception apparatus comprising a connection unit image of the content reception apparatus.

14. The content transmission apparatus of claim 9, further comprising an output unit which is controlled by the control unit to output confirmation information indicating the content reception apparatus, based on a result of the comparing and the obtained identification information of the content reception apparatus, wherein the confirmation information comprises information confirming whether to transmit the content.

15. The content transmission apparatus of claim 9, wherein the identification information obtaining unit obtains an identification information by capturing an image of an identification information disposed on the content reception apparatus.

16. A method of transmitting content comprising:

capturing on a content transmission apparatus at least one image to be transmitted to a content reception apparatus;

photographing an image of the content reception apparatus by using the content transmission apparatus;

obtaining identification information of the content reception apparatus from the photographed image of the content reception apparatus;

outputting on the content transmission apparatus confirmation information of the content reception apparatus;

displaying a message inquiring whether to transmit the at least one image to the content reception apparatus on the content transmission apparatus;

outputting a request for transmitting the at least one image from the content transmission apparatus to the content reception apparatus, when a difference between the obtained identification information of the content reception apparatus and an identification information of at least one content reception apparatus pre-stored in the content transmission apparatus is within a predetermined tolerance, and in response to a user confirming the identification of the content reception apparatus; and transmitting the at least one captured image to the content reception apparatus in response to the request.

17. The method of claim 16, wherein the transmitting of the at least one captured image is performed by a transmission request input from outside.

18. The method of claim 16, wherein the photographing the image of the content reception apparatus captures an image of an identification information disposed on the content reception apparatus.

* * * * *